(12) United States Patent
Yang et al.

(10) Patent No.: US 7,752,010 B2
(45) Date of Patent: *Jul. 6, 2010

(54) DISTANCE MEASURING APPARATUS CAPABLE OF CONTROLLING RANGE AND RESOLUTION

(75) Inventors: Wan Cheol Yang, Gyunggi-Do (KR); Chang Soo Yang, Gyunggi-Do (KR); Sang Yub Lee, Gyunggi-Do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 134 days.

This patent is subject to a terminal disclaimer.

(21) Appl. No.: 11/967,796

(22) Filed: Dec. 31, 2007

(65) Prior Publication Data

US 2008/0162048 A1 Jul. 3, 2008

(30) Foreign Application Priority Data

Jan. 2, 2007 (KR) ............... 10-2007-0000172

(51) Int. Cl.
*G01B 5/02* (2006.01)
*G01S 13/08* (2006.01)

(52) U.S. Cl. ...................... 702/158; 342/134
(58) Field of Classification Search ............... 702/158; 342/134

See application file for complete search history.

(56) References Cited

U.S. PATENT DOCUMENTS

| 7,570,199 B2 * | 8/2009 | Lee et al. ............ 342/125 |
| 2008/0068255 A1 * | 3/2008 | Yang et al. ............ 342/134 |

\* cited by examiner

*Primary Examiner*—Bryan Bui
(74) *Attorney, Agent, or Firm*—Lowe Hauptman Ham & Berner, LLP

(57) ABSTRACT

There is provided a distance measuring apparatus having system flexibility by varying a distance measuring range and a distance measuring resolution according to an environment and circumstance. The apparatus includes a reference pulse generator and a delay pulse generator capable of controlling frequencies of a reference pulse and a delay pulse and duty ratios of the reference pulse and the delay pulse. The reference pulse generator and the delay pulse generator include a programmable clock generation unit generating a clock of a frequency determined by a frequency control signal and a duty ratio control unit controlling a duty ratio of the clock generated by the programmable clock generation unit.

5 Claims, 4 Drawing Sheets

US 7,752,010 B2

DISTANCE MEASURING APPARATUS CAPABLE OF CONTROLLING RANGE AND RESOLUTION

CROSS-REFERENCE TO RELATED APPLICATIONS

This application claims the priority of Korean Patent-Application No. 2007-0000172 filed on Jan. 2, 2007, in the Korean Intellectual Property Office, the disclosure of which is incorporated herein by reference.

BACKGROUND OF THE INVENTION

1. Field of the Invention

The present invention relates to a distance measuring apparatus, and more particularly, to a distance measuring apparatus having system flexibility by varying a distance measuring range and a distance measuring resolution according to an environment and circumstance.

2. Description of the Related Art

In general, wireless location awareness technologies employ a method of measuring a present location via wireless communication with another wireless communication device by using a wireless signal. Location information obtained by wireless location awareness technologies is importantly used to effectively utilize information obtained by wireless communication via a more effective network configuration.

To improve accuracy of location awareness in such wireless location awareness technologies, it is very important to accurately detect a distance between two wireless communication devices and there is generally applied a method of calculating the distance by detecting time of arrival (TOA) in wireless communication between the two wireless communication devices to measure a distance. Also, to detect TOA, there is applied a method of detecting TOA by counting predetermined pulses by using a counter and using a value of the counting and frequencies of the pulses.

The present applicant filed "Apparatus and Method for Estimating Distance Using Time of Arrival" (Korean Patent Application No. 2006-0090309, on Sep. 18, 2006). There is disclosed an apparatus for estimating a distance using TOA as shown in FIG. 1.

The apparatus of FIG. 1 includes a reference pulse generator 11 generating a reference pulse having a first frequency $f_0$ at a point in time of transmitting a ranging signal from the first wireless communication device 10 to the second wireless communication device 20; a delay pulse generator 12 generating a delay pulse signal having a second frequency $f_1$ different from the first frequency f0 at a point in time of receiving the a response signal transmitted from the second communication device 20 in response to the ranging signal, the first wireless communication device 10 receiving the response signal; an overlap detector 13 detecting a point in time that the reference pulse and the delay pulse overlap each other; a counter 14 counting one of the reference pulse and the delay pulse until the point in time that the reference pulse and the delay pulse overlap each other; and a distance calculator 15 calculating an amount of time from the point in time of transmitting the ranging signal to the point in time of receiving the response signal by applying the first frequency $f_0$, the second frequency $f_1$, and a count value N of the counter 14 and calculating the distance between the first wireless communication device 10 and the second wireless communication device 20 by using the amount of time.

FIG. 2 is a timing diagram illustrating operations of the apparatus of FIG. 1. Referring to FIG. 2, in the prior application, the amount of time Tx from the point in time t0 of transmitting the ranging signal to the point in time t1 of receiving the response signal is calculated as following Equation 1, $$Tx = N \cdot \left| \frac{1}{f_0} - \frac{1}{f_1} \right| + \delta \qquad \text{Equation (1)}$$

The amount of time Tx indicates an amount time of a signal roundtrip between the first wireless communication device 10 and the second wireless communication device 20. Accordingly, when multiplying ½ of the amount of time Tx by the velocity of light, the distance between the two wireless communication devices 10 and 20 may be obtained.

However, since a maximum value capable of being measurable of the amount of time Tx is fixed in the apparatus of the prior application, when the amount of time Tx is greater than a maximum measurable value ($T_{MAX}$), a distance is hardly measured. That is, the apparatus of the prior application cannot be used when it is required to measure a farther distance due to a change in a distance measuring environment. For example, when the apparatus of the prior application is capable of measuring a distance of 10 m to the maximum, it is impossible to apply the apparatus of the prior application to an environment where it is required to measure a distance of 20 m.

Also, in the apparatus of the prior application, since an accuracy of distance measuring is fixed by frequencies of a reference pulse and a delay pulse, though applied to an environment where a maximum distance to be measured is reduced, it is impossible to increase the accuracy. For example, when the apparatus is capable of measuring a distance of 30 m to the maximum, though the apparatus is applied to an environment where it is required to measure a distance of 10 m, the accuracy is incapable of being improved.

SUMMARY OF THE INVENTION

An aspect of the present invention provides a distance measuring apparatus having system flexibility by varying a distance measuring range and distance measuring resolution according to an environment and circumstance.

According to an aspect of the present invention, there is provided a distance measuring apparatus measuring a distance between a first wireless communication device and a second wireless communication device communicating with each other, the apparatus including: a reference pulse generation unit including a first programmable clock generation unit generating a clock of a first frequency and a first duty ratio control unit generating a reference pulse by adjusting a duty ratio of the clock of the first frequency, and outputting the reference pulse at a point in time that the first wireless communication device transmits a distance measuring signal to the second wireless communication device; a delay pulse generation unit including a second programmable clock generation unit generating a clock of a second frequency different from the first frequency and a second duty ratio control unit generating a delay pulse by adjusting a duty ratio of the clock of the second frequency, and generating the delay pulse at a point in time that the first wireless communication device receives a response signal transmitted from the second wireless communication device in response to the distance measuring signal; an overlap detector detecting a point in time that the reference pulse overlaps the delay pulse; a counter counting one of the reference pulse and the delay pulse to the overlap point in time; and a distance calculator calculating an amount of time from a point in time of receiving the distance measuring signal to a point in time of receiving the response signal by applying the first frequency, the second frequency, and a count value of the counter, and calculating the distance between the first wireless communication device and the second wireless communication device by using the amount of time.

The distance calculator may calculate the amount of time from the point in time of receiving the distance measuring signal to the point in time of receiving the response signal according to following Equation 1, $$Tx = N \cdot \left| \frac{1}{f_0} - \frac{1}{f_1} \right| + \delta \quad \text{Equation (1)}$$

wherein Tx indicates the amount of time from the point in time of receiving the distance measuring signal to the point in time of receiving the response signal, N indicates one of the count value of the reference pulse and the count value of the delay pulse, $f_0$ indicates a frequency of the reference pulse, $f_1$ indicates a frequency of the delay pulse, and $\delta$ indicates a certain offset value.

The reference pulse generation unit may determine a maximum measurable value of the amount of time from the point in time of receiving the distance measuring signal to the point in time of receiving the response signal by adjusting the frequency and a duty ratio of the reference pulse, according to following Equation 2, $$T_{MAX} = T_0 \times (1 - 2 \times r_d) \quad \text{Equation (2)}$$

wherein $T_{MAX}$ indicates the maximum measurable value of the amount of time from the point in time of receiving the distance measuring signal to the point in time of receiving the response signal, $T_0$ indicates a period of the reference pulse, and $r_d$ indicates the duty ratio of one of the reference pulse and the delay pulse.

The reference pulse generation unit and the delay pulse generation unit may determine a maximum value of the count value by adjusting the frequency and the duty ratio of the reference pulse and the frequency and the duty ratio of the delay pulse according to following Equation 3, $$N_{MAX} = T_n \times (1 - 2 \times r_d) + 1 \quad \text{Equation (3)}$$

wherein $N_{MAX}$ indicates the maximum value of the count value, $T_n = 1/f_n$, $f_n = |(f_1 - f_0)/f_0|$, and $f_0$ indicates the frequency of the reference pulse, and $f_1$ indicates the frequency of the delay pulse.

A distance measuring resolution of the distance measuring apparatus may be determined by following Equation 4, $$R_{res} = \frac{D_{MAX}}{N_{MAX}} \quad \text{Equation (4)}$$

wherein $R_{res}$ indicates the distance measuring resolution of the distance measuring apparatus, $D_{MAX} = 0.5 \cdot T_{MAX} \cdot c$, and c indicates the velocity of light.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may however be embodied in many different forms and should not be construed as limited to the embodiment set forth herein. Rather, these embodiments are provided so that this disclosure will be thorough and complete, and will fully convey the scope of the invention to those skilled in the art. Also, terms used in describing the embodiment of the present invention are defined by considering functions in the embodiment of the present invention, may vary with an intention of those skilled in the art or a usage thereof, and do not limit the scope of the technical features of the present invention.

Figure 1:
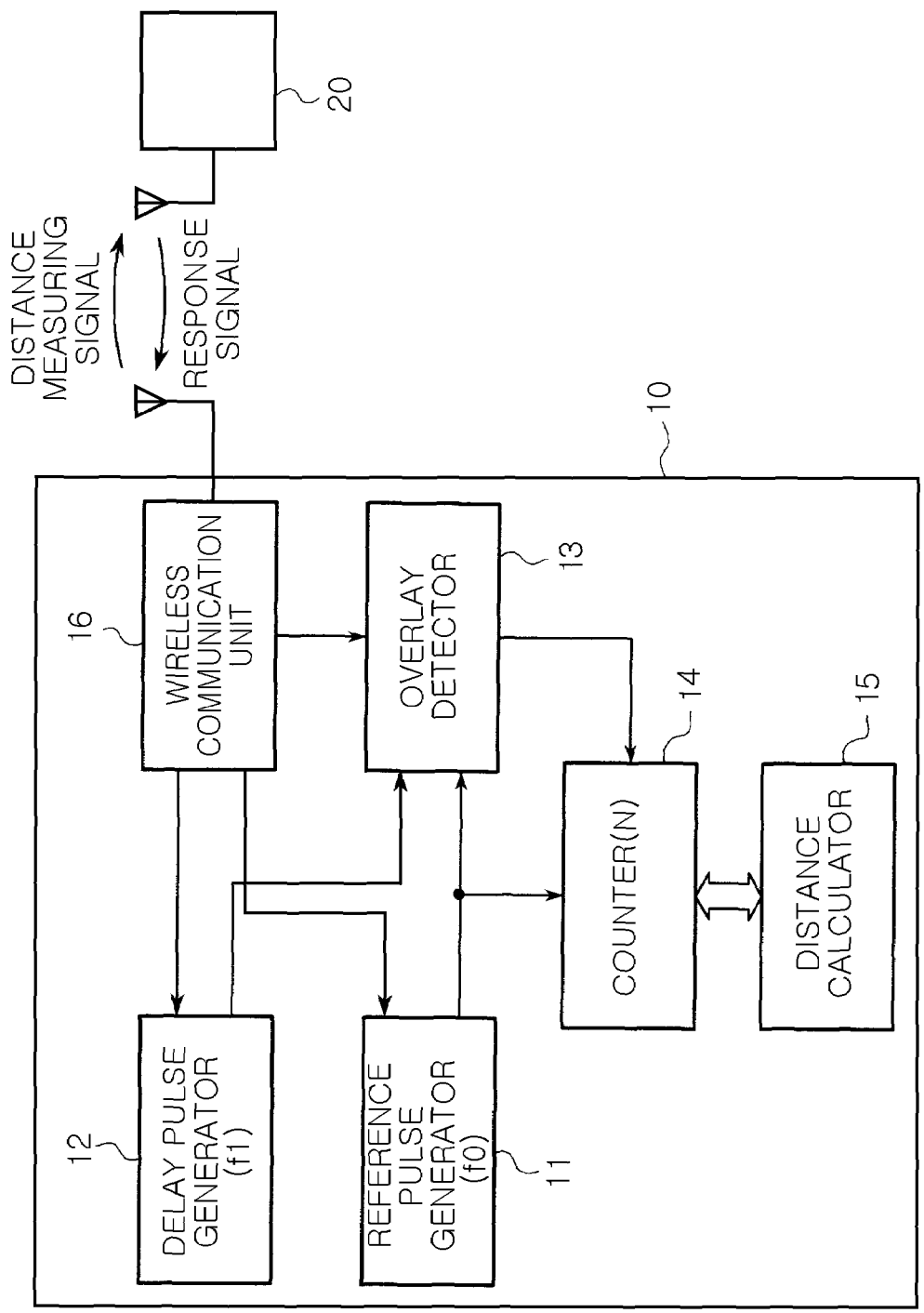
FIG. 1 is a block diagram illustrating a configuration of an apparatus for estimating a distance, filed prior to filing of the present invention.
Figure 3:
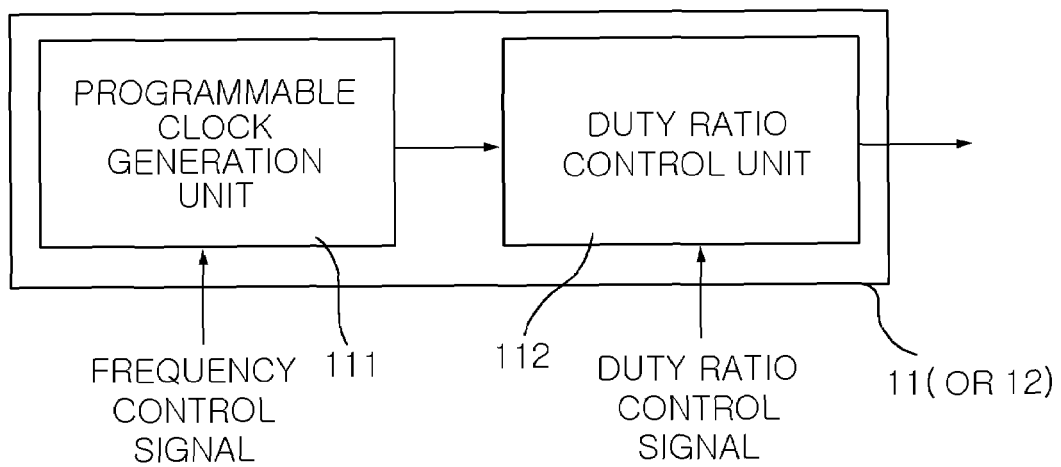
FIG. 3 is a block diagram illustrating a detailed configuration of one of a reference pulse generation unit and a delay pulse generation unit of a distance measuring apparatus according to an exemplary embodiment of the present invention.

FIG. 1 is a block diagram illustrating an apparatus for estimating distance disclosed in Korean Patent Application No. 2006-0090309 ("Apparatus and Method for Estimating Distance Using Time of Arrival", filed by the present inventor, on Sep. 18, 2006). FIG. 3 is a block diagram illustrating a detailed configuration of one of a delay pulse generator 12 and a reference pulse generator 11 according to an exemplary embodiment of the present invention. The configuration shown in FIG. 3 is identically applied to the delay pulse generator 12 and the reference pulse generator 11. The present invention is completed by applying the detailed configuration of one of delay pulse generator 12 and the reference pulse generator 11 shown in FIG. 3 to the configuration of the prior application shown in FIG. 1.

Referring to FIGS. 1 and 3, a distance measuring apparatus according to an exemplary embodiment of the present invention includes the reference pulse generator 11, a delay pulse generator 12, an overlap detector 13, a counter 14, and a distance calculator 15. The distance measuring apparatus is applied to measure a distance between a first wireless communication device 10 and a second wireless communication device 20 and may be included in one of the first wireless communication device 10 and the second wireless communication device 20 (included in the first wireless communication device 10 in FIG. 1). The wireless communication devices 10 and 20 may include a wireless communication unit 16 to perform wireless communication therebetween.

In the present embodiment, the reference pulse generator 11 includes a programmable clock generation unit 111 generating a clock of a first frequency f and a first duty ratio control unit 112 generating a reference pulse by adjusting a duty ratio of the clock of the first frequency $f_0$. The reference pulse generator 11 outputs the reference pulse at a point in time of transmitting a distance measuring signal from the first wireless communication device 10 to the second wireless communication device 20.

The delay pulse generator 12 according to an exemplary embodiment of the present invention includes a second programmable clock generation unit 111 generating a clock of a second frequency $f_1$ different from the first frequency $f_0$ and a second duty ratio control unit 112 generating a delay pulse by adjusting a duty ratio of the clock of the second frequency $f_1$ at the same duty ratio as that of the first duty ratio control unit. The delay pulse generator 12 outputs the delay pulse at a point in time that the first communication device 10 receives a response signal transmitted from the second wireless communication device 20 in response to the distance measuring signal.

By adjusting the frequencies and duty ratios of the reference pulse and the delay pulse, the reference pulse generator 11 and the second delay pulse generator 12 may control a distance measuring range, which is a allowable measuring distance, and a distance measuring resolution of the distance measuring apparatus, according to an environment. This will be described in detail in a description on operations of the present invention.

The overlap detector 13 detects a point in time that the reference pulse overlaps the delay pulse.

The counter 14 counts one of the reference pulse and the delay pulse to the overlap point in time and outputs a count value N.

The distance calculator 15 calculates an amount of time from a point in time of receiving the distance measuring signal to a point in time of receiving the response signal by applying the first frequency $f_0$, the second frequency $f_1$, and a count value N of the counter, and calculating the distance between the first wireless communication device 10 and the second wireless communication device 20 by using the amount of time.

Hereinafter, operations and effects of the present invention will be described in detail.

When distance measuring starts, a reference pulse is outputted from the reference pulse generator 11 and the counter 14 counts the reference pulse. The wireless communication unit 16 of the first wireless communication device 10 transmits a distance measuring signal to the second wireless communication device 20, and at the same time, the reference pulse generator 11 generates a clock whose frequency is determined by a frequency control signal, and the duty ratio control unit 112 generates and outputs a reference pulse by adjusting a duty ratio of the clock according to a duty ratio control signal. A frequency of the reference pulse is a first frequency $f_0$. Simultaneously with this, the counter 14 starts counting the reference pulse. The transmitting of the distance measuring signal, the outputting of the reference pulse, and the start of the counting are performed at the point in time t0 of FIG. 2.

Though, in the present embodiment, the counter 14 counts the reference pulse, in another embodiment, the counter 14 may count a delay pulse having a second frequency, which will be described later. This will be described in detail below.

The second wireless communication device 20 receives the distance measuring signal and transmits a response signal responding thereto to the first wireless communication device 20. When the first wireless communication device 10 detects the response signal, the delay pulse generator 12 outputs a delay pulse at the point in time t1 of detecting the response signal. That is, in the delay pulse generator 12, the programmable clock generation unit 111 generates a clock whose frequency is determined to be different the first frequency $f_0$ according to a frequency control signal and the duty ratio control unit 112 generates and outputs a reference pulse having the same duty ratio as the reference pulse by adjusting a duty ratio of the clock according to a duty ratio signal. A frequency of the reference pulse is determined to be a second frequency $f_1$. In this case, the counter 14 continuously counts the reference pulse. As described above, in another embodiment of the present invention, the delay pulse may be counted instead of the reference pulse. Accordingly, in another embodiment of counting the delay pulse, simultaneously with activating the delay pulse, the counter 14 starts counting the delay pulse.

When the overlap detector 13 detects a portion where the reference pulse overlaps the delay pulse, the counter 14 finishes the counting of the reference pulse and transfers a count value $N_0$ from the point in time t0 of transmitting the distance measuring signal, that is, a point in time of outputting the reference pulse, to a point in time t2 of detecting the overlap between the reference and the delay pulse to the distance calculator 15. The distance calculator 15 calculates a distance between the first wireless communication device 10 and the second wireless communication device 20 by using the count value $N_0$.

Figure 2:
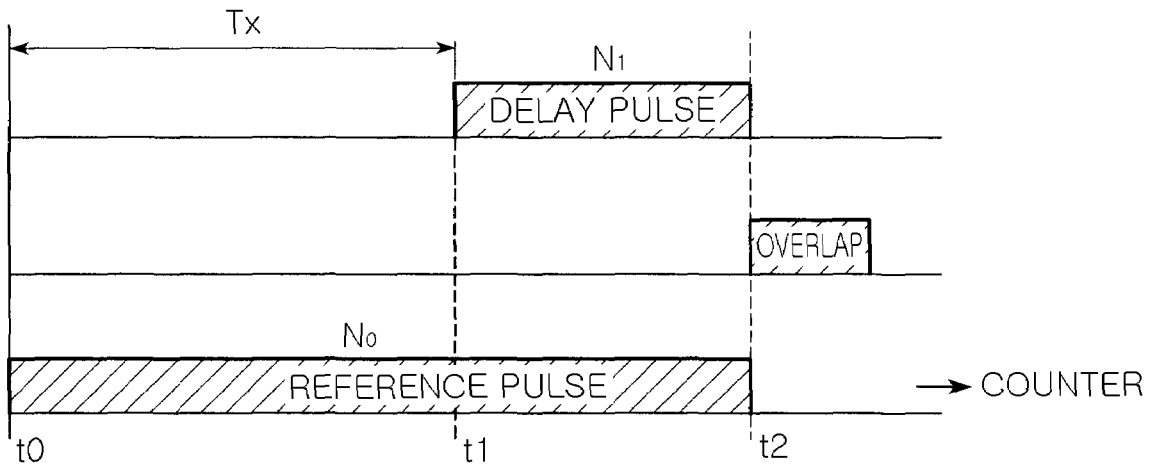
FIG. 2 is a timing diagram illustrating operations of the distance measuring apparatus of FIG. 1.

A method of measuring the distance between the first wireless communication device 10 and the second wireless communication device 20, which is performed in the distance calculator 15, will be described in detail with reference to FIG. 2.

As described above, the point in time of transmitting a distance measuring signal from the first wireless communication device 10 is designated as t0, the point in time that the first wireless communication device 10 receives a response signal of the second wireless communication device 20 in response to the distance measuring signal is designated as t1, and the point in time of detecting an overlap between a reference pulse and a delay pulse is designated as t2. Also, the amount of time from the point in time of transmitting the distance measuring signal to the point in time of receiving the response signal is designated as Tx, the count value of the reference pulse to the point in time of detecting the overlap is designated as $N_0$, and a count value of the delay pulse to the point in time of detecting the overlap is designated as $N_1$. As described above, since only one of the reference pulse and the delay pulse is counted in the present invention, the count values $N_0$ and $N_1$ are not obtained by counting but are just defined for a description.

The point in time t2 of detecting the overlap may be obtained by using the count value $N_0$ of the reference pulse and the count value $N_1$ of the delay pulse as following Equation 5, $$t2 = \frac{N_0}{f_0} = Tx + \frac{N_1}{f_1} \qquad \text{Equation (5)}$$

wherein $f_0$ indicates the first frequency that is a frequency of the reference pulse and $f_1$ indicates the second frequency that is a frequency of the delay pulse.

As Equation 5 and following Equation 6, the amount of time Tx from the point in time of transmitting the distance measuring signal to the point in time of receiving the response signal may be obtained. Since the amount of time Tx indicates an amount of time where a roundtrip of a signal between two wireless communication devices is performed, a distance between the two wireless communication devices may be calculated by determining the amount of time Tx.

$$Tx = \frac{N_0}{f_0} - \frac{N_1}{f_1} \qquad \text{Equation (6)}$$

On the other hand, when distance measuring is performed within a range where a value of Tx is smaller enough than one of a period $1/f_0$ of the reference pulse and a period $1/f_1$ of the delay pulse, for example, an indoor environment having a radius of 30 m or less, the count value $N_0$ of the reference pulse has a value approximately identical to the count value $N_1$ of the delay pulse. Accordingly, Equation 6 may be approximated as following Equation 1, $$Tx = N \cdot \left| \frac{1}{f_0} - \frac{1}{f_1} \right| + \delta \qquad \text{Equation (1)}$$

wherein N indicates a count value of one of the reference pulse and the delay pulse.

An offset value δ capable of being determined arbitrarily in Equation 1 includes all error components that may be included in a process where the present invention is applied to. For example, there may be included an error component that may occur when the count value $N_0$ of the reference pulse is approximated to the count value $N_1$ of the delay pulse in a process of deducing Equation 2. Also, there may be included an error component caused by an amount of time used to process a signal in the second wireless communication device 20 in a process of receiving the distance measuring signal transmitted from the wireless communication device 10 and transmitting the response signal in response thereto. The offset value δ may be determined an experimental method as executing calibration at a unit distance, for example, 1 m.

On the other hand, the present inventors found that a distance measuring range and a distance measuring resolution may be adjusted by appropriately controlling the frequency $f_0$ and duty ratio of the reference pulse and the frequency $f_1$ and duty ratio of the delay pulse, generated by the distance measuring apparatus, via repeated experiments and simulations.

A maximum measurable value of the amount of time from the point in time of transmitting the distance measuring signal to the point in time of receiving the response signal, which may be used to calculate the distance measuring range of the distance measuring apparatus may be determined as following Equation 2, $$T_{MAX} = T_0 \times (1 - 2 \times r_d) \qquad \text{Equation (2)}$$

wherein $T_{MAX}$ indicates the maximum measurable value of the amount of time from the point in time of transmitting the distance measuring signal to the point in time of receiving the response signal, $T_0$ indicates a period of the reference pulse, and $r_d$ indicates a duty ratio of one of the reference pulse and the delay pulse.

Since the maximum measurable value of the amount of time from the point in time of transmitting the distance measuring signal to the point in time of receiving the response signal is determined by Equation 2, a distance measuring range $D_{MAX}$ of the distance measuring apparatus may be determined as following Equation 7, $$D_{MAX} = 0.5 \times T_0 \times (1 - 2 \times r_d) \times c \qquad \text{Equation (7)}$$

wherein c indicates the velocity of light.

Also, it has been found that a maximum value of a count value outputted by the counter 14 by adjusting the frequency and duty ratio of the reference pulse generated by the reference pulse generator and the frequency and the duty ratio of the delay pulse generated by the delay pulse generator may be determined as following Equation 3, $$N_{MAX} = T_n \times (1 - 2 \times r_d) + 1 \qquad \text{Equation (3)}$$

wherein $N_{MAX}$ indicates the maximum value of the count value, is identical to $1/f_n$, and $f_n$ is obtained by regulating a frequency difference between the reference pulse and the delay pulse as $|(f_1 - f_0)/f_0|$ where $f_0$ indicates the frequency of the reference pulse and $f_1$ indicates the frequency of the delay pulse.

Also, the distance measuring resolution of the distance measuring apparatus may be determined by a ratio between the distance measuring range of the distance measuring apparatus and the maximum count value, which is expressed as following Equation 4, $$R_{res} = \frac{D_{MAX}}{N_{MAX}} \qquad \text{Equation (4)}$$

wherein $R_{res}$ indicates the distance measuring resolution of the distance measuring apparatus.

As described above, as shown in Equations 2 to 4 and 7, trade off of the distance measuring range and the distance measuring resolution may be freely set by using three factors such as the frequency $f_0$ of the reference pulse, a deviation $f_n$ between the reference pulse frequency and the delay pulse frequency, and the duty ratio $r_d$. Accordingly, flexibility of the distance measuring apparatus may be improved.

FIGS. 4 to 7 are graphs illustrating various properties of the distance measuring apparatus according to an exemplary embodiment of the present invention.

Figure 4:
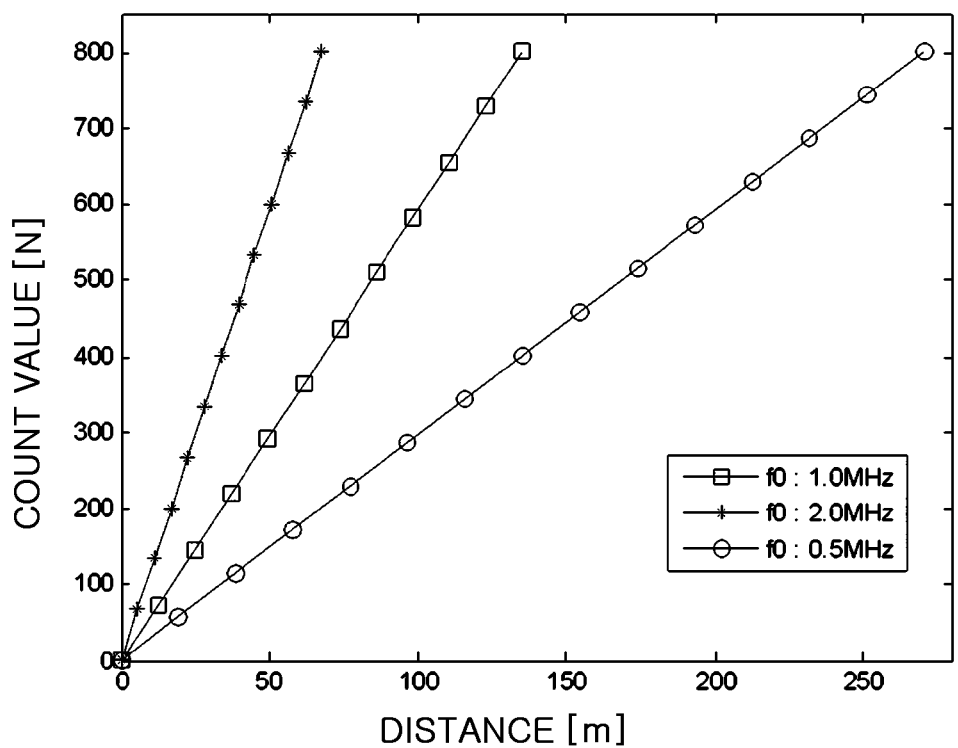
FIGS. 4 to 7 are graphs illustrating various properties of the distance measuring apparatus of FIG. 3.

FIG. 4 is a graph illustrating a relation between the distance measuring range and the count value in respective cases where the frequency $f_0$ of the reference pulse is changed as 1.0, 2.0, and 0.5 MHz when the duty ratio and the regulated frequency difference fn shown in FIG. 3 are fixed.

As shown in FIG. 4, as the frequency $f_0$ of the reference pulse is low, the distance measuring range is increased. It may be known from Equation 2 illustrating a relation between the amount of time Tx and the maximum measurable value $T_{MAX}$. This is, the distance measuring range $D_{MAX}$ is obtained by multiplying the maximum value $T_{MAX}$ of the amount of time Tx by a constant (0.5*the velocity of light). Also, FIG. 4 illustrates a result of Equation 4 illustrating that the distance measuring resolution $R_{res}$ is increased (accuracy is decreased) since the distance measuring range $D_{MAX}$ is increased as the frequency of the reference pulse is decreased (the period of the reference pulse is increased) as Equation 1 when the maximum value $N_{MAX}$ is of the count value in Equation 3 is fixed because $T_n$ and $r_d$ are fixed.

As shown in FIG. 4, in the present embodiment, when the duty ratio and the regulated frequency difference fn are fixed, the trade off between the accuracy and the distance measuring range of the distance measuring apparatus is possible by changing the frequency of the reference pulse. That is, in the present embodiment, though reducing the distance measuring range, the accuracy of the distance measuring may be improved by reducing the frequency of the reference pulse. On the other hand, though reducing the accuracy of the distance measuring, the distance measuring range may be increased by increasing the frequency of the reference pulse.

Figure 5:
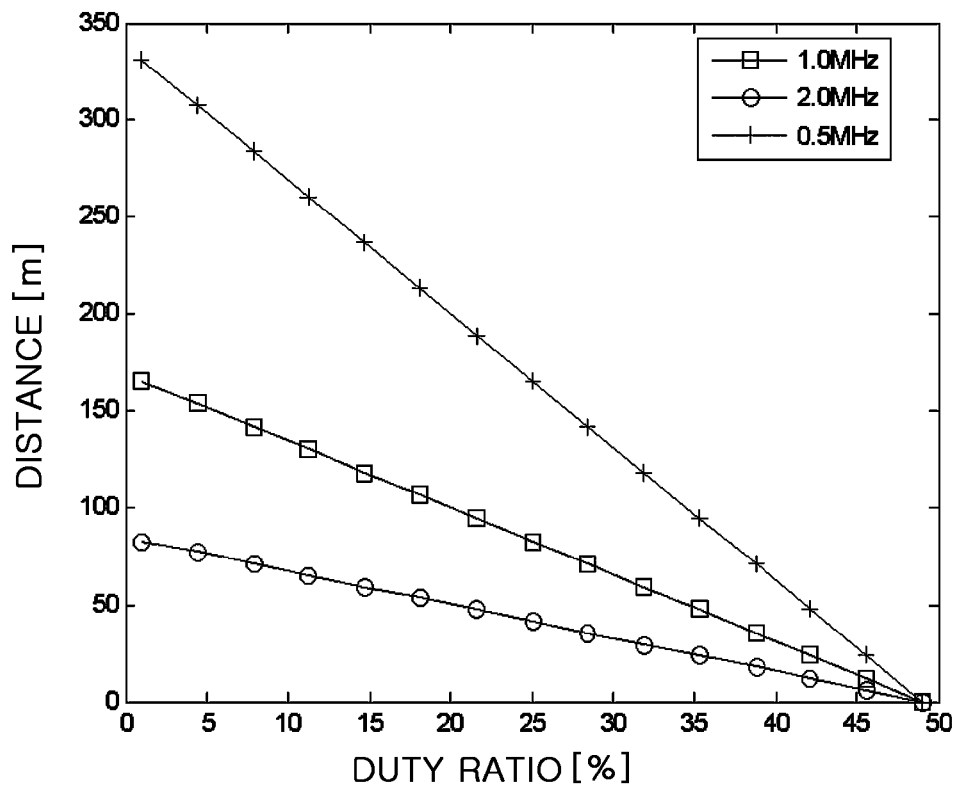
Figure 6:
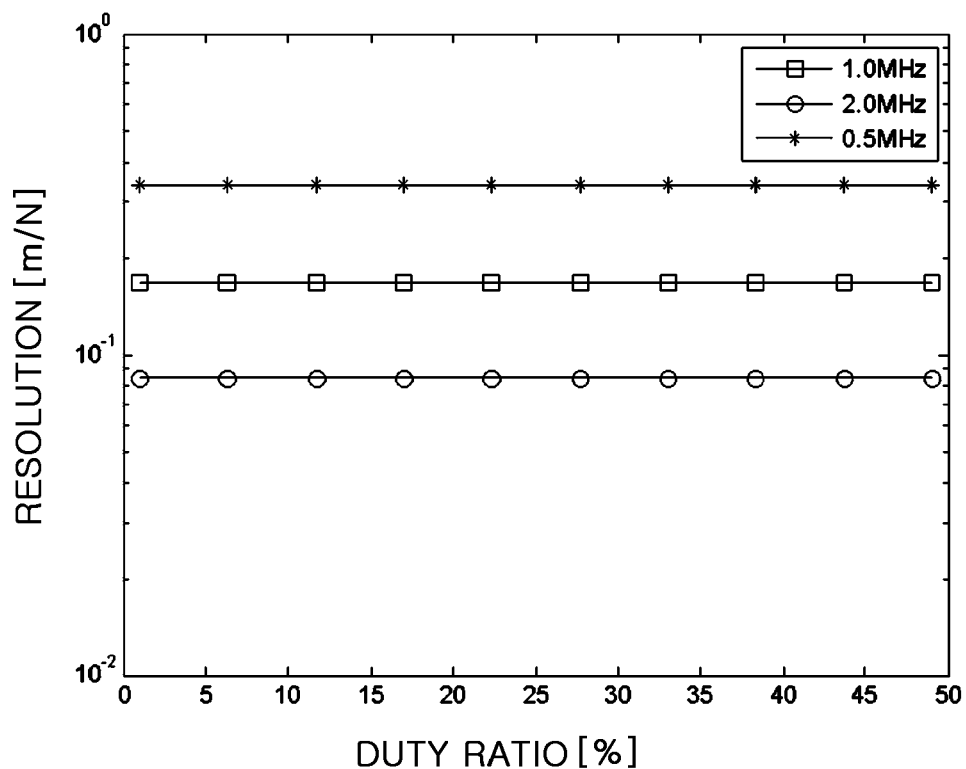

FIGS. 5 and 6 illustrate changes in a duty ratio and a distance measuring range and a duty ratio and a distance measuring resolution when changing the frequency $f_0$ of the reference pulse as 1.0, 2.0, and 0.5 MHz, respectively, when the regulated frequency difference fn is fixed.

Referring to FIG. 5, an inverse proportional relation between the duty ratio and the distance measuring range D=shown in Equation 2 may be known. That is, since the maximum measurable value $T_{MAX}$ increases as the duty ratio increases, the distance measuring range $D_{MAX}$ increases. Also, referring to FIG. 6, as shown in Equations 3 and 7, since amounts of variances of the distance measuring range $D_{MAX}$ and the maximum count value $N_{MAX}$ due to a variance of the duty ratio are identical to each other, the distance measuring resolution shown in Equation 4 has no change according to the variance of the duty ratio.

As the result shown in FIGS. 5 and 6, the distance measuring apparatus according to an exemplary embodiment of the present invention may increase the distance measuring range while maintaining the accuracy thereof as it is, by adjusting the duty ratio while fixing the frequency difference between the reference pulse and the delay pulse.

Figure 7:
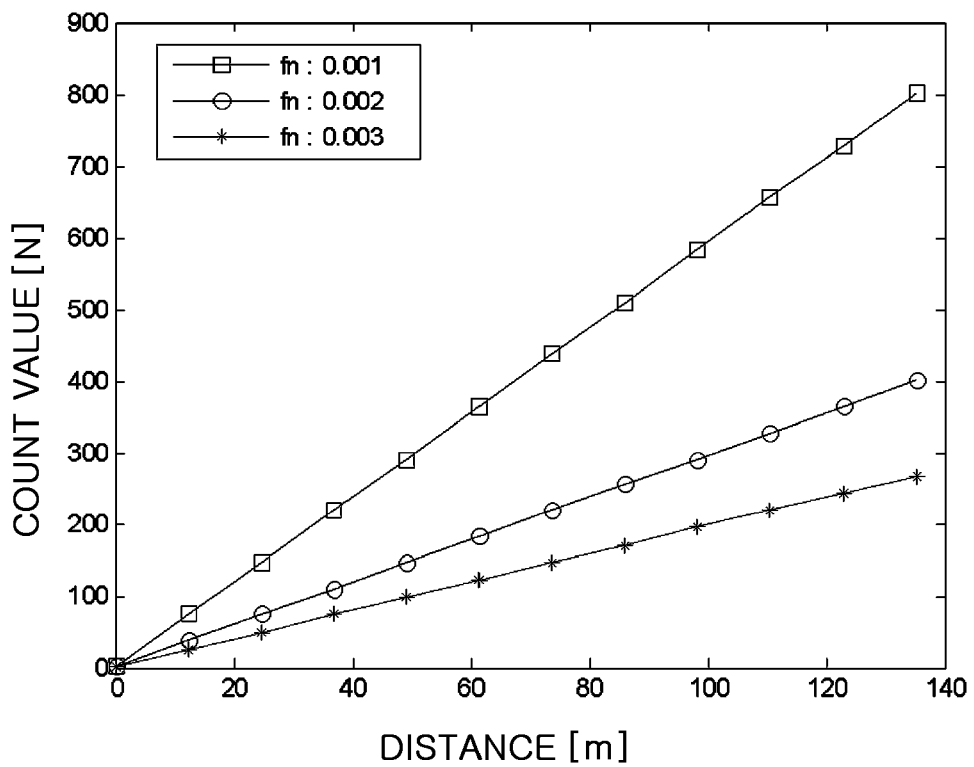

FIG. 7 illustrates a relation between the distance measuring range and the count value N when changing the regulated frequency difference fn as 0.001, 0.002, and 0.003 by adjusting the frequency $f_1$ of the delay pulse while fixing the duty ratio and the frequency $f_0$ of the reference pulse.

As shown in FIG. 7, it may be known that an inclination increases as the frequency difference is small. That is, there is illustrated a result of Equation 3 where the count value increases as the frequency difference fn is small (a period difference T is great). As the count value increases, a resolution value of the distance measuring apparatus becomes smaller (the accuracy thereof becomes great) by Equation 4. That is, the distance measuring apparatus may improve the accuracy of the distance measuring while maintaining the distance measuring range, by controlling the regulated frequency difference fn when the frequency f and the duty ratio of the reference pulse are fixed.

As described above, according to an exemplary embodiment of the present invention, there is provided a distance measuring apparatus capable of flexibly changing a distance measuring range and accuracy thereof by adjusting a frequency of a reference pulse and a frequency of a delay pulse, that is, a frequency difference between the reference pulse and the delay pulse and a duty ratio of one of the reference pulse and the delay pulse. Accordingly, there is provided an excellent effect of providing system flexibility of the distance measuring apparatus according to an environment and circumstance where the distance measuring apparatus is applied.

While the present invention has been shown and described in connection with the exemplary embodiments, it will be apparent to those skilled in the art that modifications and variations can be made without departing from the spirit and scope of the invention as defined by the appended claims.

What is claimed is:

1. A distance measuring apparatus measuring a distance between a first wireless communication device and a second wireless communication device communicating with each other, the apparatus comprising:
   a reference pulse generator including a first programmable clock generation unit generating a clock of a first frequency and a first duty ratio control unit generating a reference pulse by adjusting a duty ratio of the clock of the first frequency, and outputting the reference pulse at a point in time that the first wireless communication device transmits a distance measuring signal to the second wireless communication device;
   a delay pulse generator including a second programmable clock generation unit generating a clock of a second frequency different from the first frequency and a second duty ratio control unit generating a delay pulse by adjusting a duty ratio of the clock of the second frequency, and generating the delay pulse at a point in time that the first wireless communication device receives a response signal transmitted from the second wireless communication device in response to the distance measuring signal;
   an overlap detector detecting a point in time that the reference pulse overlaps the delay pulse;
   a counter counting one of the reference pulse and the delay pulse to the overlap point in time; and
   a distance calculator calculating an amount of time from a point in time of receiving the distance measuring signal to a point in time of receiving the response signal by applying the first frequency, the second frequency, and a count value of the counter, and calculating the distance between the first wireless communication device and the second wireless communication device by using the amount of time.

2. The apparatus of claim 1, wherein the distance calculator calculates the amount of time from the point in time of receiving the distance measuring signal to the point in time of receiving the response signal according to following Equation 1, $$Tx = N \cdot \left| \frac{1}{f_0} - \frac{1}{f_1} \right| + \delta \qquad \text{Equation (1)}$$

wherein Tx indicates the amount of time from the point in time of receiving the distance measuring signal to the point in time of receiving the response signal, N indicates one of the count value of the reference pulse and the count value of the delay pulse, $f_0$ indicates a frequency of the reference pulse, $f_1$ indicates a frequency of the delay pulse, and $\delta$ indicates a certain offset value.

3. The apparatus of claim 1, wherein the reference pulse generator determines a maximum measurable value of the amount of time from the point in time of receiving the distance measuring signal to the point in time of receiving the response signal by adjusting the frequency and a duty ratio of the reference pulse, according to following Equation 2, $$T_{MAX} = T_0 \times (1 - 2r_d) \qquad \text{Equation (2)}$$

wherein $T_{MAX}$ indicates the maximum measurable value of the amount of time from the point in time of receiving the distance measuring signal to the point in time of receiving the response signal, $T_0$ indicates a period of the reference pulse, and $r_d$ indicates the duty ratio of one of the reference pulse and the delay pulse.

4. The apparatus of claim 3, wherein the reference pulse generator and the delay pulse generator determine a maximum value of the count value by adjusting the frequency and the duty ratio of the reference pulse and the frequency and the duty ratio of the delay pulse according to following Equation 3, $$N_{MAX} = T_n \times (1 - 2 \times r_d) + 1 \qquad \text{Equation (3)}$$

wherein $N_{MAX}$ indicates the maximum value of the count value, $T_n = 1/f_n$, $f_n = |(f_1 - f_0)/f_0|$, and $f_0$ indicates the frequency of the reference pulse, and $f_1$ indicates the frequency of the delay pulse.

5. The apparatus of claim 4, wherein a distance measuring resolution of the distance measuring apparatus is determined by following Equation 4, $$R_{res} = \frac{D_{MAX}}{N_{MAX}} \qquad \text{Equation (4)}$$

wherein $R_{res}$ indicates the distance measuring resolution of the distance measuring apparatus, $D_{MAX} = 0.5 \cdot T_{MAX} \cdot c$, and c indicates the velocity of light.

* * * * *